(12) United States Patent  
Koellner et al.

(10) Patent No.: US 8,065,836 B2  
(45) Date of Patent: Nov. 29, 2011

(54) DOOR MODULE

(75) Inventors: Harald Koellner, Altenstadt (DE); Enrico Schliwa, Lauchroden (DE); Eric Zimmerman, Kassel (DE); Bernhard Eckhardt, Wetzlar (DE); Sebastian Wandtke, Gottingen (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 709 days.

(21) Appl. No.: 10/562,172

(22) PCT Filed: Jun. 24, 2004

(86) PCT No.: PCT/EP2004/006847  
§ 371 (c)(1), (2), (4) Date: Dec. 21, 2005

(87) PCT Pub. No.: WO2004/113105  
PCT Pub. Date: Dec. 29, 2004

(65) Prior Publication Data  
US 2007/0107315 A1    May 17, 2007

(30) Foreign Application Priority Data  
Jun. 25, 2003 (DE) ................................ 103 29 238

(51) Int. Cl.  
*B60J 1/08* (2006.01)

(52) U.S. Cl. ...................... 49/502; 296/146.1; 296/146.7
(58) Field of Classification Search ................... 49/502; 296/146.7, 146.1  
See application file for complete search history.

(56) References Cited

U.S. PATENT DOCUMENTS

| 4,597,153 | A |  | 7/1986 | Zaydel |
| 4,845,894 | A |  | 7/1989 | Herringshaw et al. |
| 5,048,234 | A | * | 9/1991 | Lau et al. ................. 49/502 |
| 5,927,021 | A |  | 7/1999 | Kowalski et al. |
| 6,381,906 | B1 | * | 5/2002 | Pacella et al. ............. 49/502 |
| 6,412,852 | B1 | * | 7/2002 | Koa et al. ............... 296/146.7 |
| 6,676,195 | B1 | * | 1/2004 | Marriott et al. ........ 296/146.7 |
| 6,862,846 | B1 | * | 3/2005 | Kirejczyk .................. 49/502 |
| 7,100,330 | B2 | * | 9/2006 | Reul et al. ................. 49/502 |
| 2001/0037607 | A1 | * | 11/2001 | Pfeiffer et al. ............. 49/502 |
| 2004/0049988 | A1 | * | 3/2004 | Reul et al. ................. 49/502 |

FOREIGN PATENT DOCUMENTS

| DE | 696 06 263 | 8/2000 |
| DE | 199 46 307 | 4/2001 |
| DE | 100 40 954 | 3/2002 |
| EP | 1 060 918 | 12/2000 |

* cited by examiner

*Primary Examiner* — Gregory J. Strimbu  
(74) *Attorney, Agent, or Firm* — Fay Kaplun & Marcin, LLP

(57) ABSTRACT

A module covers an opening in a motor vehicle door and supports a door inner trim. The module comprises a base body including a base and at least one bracket movable with respect to the base. The bracket includes a supporting surface contacting an edge of the opening. The bracket includes at least one fixation point for fastening to the door inner trim.

13 Claims, 4 Drawing Sheets

- PRIOR ART -

Fig. 2a — PRIOR ART —

DOOR MODULE

FIELD OF INVENTION

The present invention relates to a door module for covering openings in a motor vehicle door.

BACKGROUND INFORMATION

Door modules for covering openings in motor vehicle doors and for holding functional elements such as electrical window-lifting arrangements, loudspeakers, etc. are basically already known. In order to provide a pleasant appearance in the vehicle interior, the door module however needs further to be covered with a door inner trim on the side of the vehicle interior.

This door inner trim is usually attached at any location of the door module. With this however, it is to be taken care that the gap dimension between the door inner trim and a door inner panel, in which the opening for the door module is provided, does not exceed a certain magnitude. This tolerance requirement is however quite difficult to realise in practise, since on the one hand the door module must be fitted very exactly into the opening of the door inner panel, and additionally the door inner trim yet also needs to be positioned in a very exact manner, in order to achieve the required gap dimension (with regard to this, FIG. 1 which is to be described further below in more detail is now already referred to, which represents a construction according to the state of the art, wherein $t_0$ represents the gap dimension which is to be observed).

Thus with this construction according to the state of the art, it is disadvantageous that either aesthetic compromises must be accepted with the gap dimension, or that the manufacturing costs are high due to the demands with regard to tolerance.

In order to avoid these disadvantages, it has been suggested not to fasten the door inner trim on the door module, but e.g. to fasten it to the door inner panel itself (these conditions are represented in FIG. 2a). By way of this it becomes easier to set the gap dimension indicated in FIG. 2a at $t_1$. But a grave disadvantage which occurs with this however is the fact that for this, one needs to incorporate holes into the door inner panel in a regular manner, which permit the entry of moisture, or which are to be sealed with very extensive and expensive means. This sealing is of utmost importance, since otherwise moisture and humidity may get behind the door inner trim from the outer side of the door module and thus the formation of rot may occur.

SUMMARY OF INVENTION

The present invention relates to a door module or a motor vehicle door containing this door module, which on the one hand may be inexpensively manufactured, and on the other hand causes no problems with regard to the formation of rot, etc.

The present invention discloses a door module for covering openings in a motor vehicle door, wherein the door module comprises a base body which preferably in an edge region of the door module comprises at least one bracket which is movable with respect to the base body (i.e. easily deformable, be it on account of the lower material thickness or separate elements such as springs etc.), for support on an edge region of the opening, wherein the bracket comprises at least one fixation point for fastening a door trim.

With this, one also succeeds in e.g. not fastening a door inner trim at any location of the base body, as was previously the case, but on the bracket.

This bracket is laid on directly in the edge region of the opening (e.g., on a door inner panel) so that a reference dimension is given here. With this, the bracket with regard to design and with regard the door inner panel is to be configured such that when the door module is fastened, the bracket always (preferably with pressure) is supported on a certain point of the inner trim. By way of the fact that the bracket comprises a fixation point for the inner trim, the door inner trim may be assembled on a reference point. By way of supporting the bracket on an edge region of the opening (e.g., on the door inner panel), the long tolerance chain described above is shortened, since the door trim via the bracket supported directly on the edge region may be positioned in a simple and exact manner with respect to the door inner panel. An exact gap dimension may be achieved by way of this in a very simple manner.

This is of most relevance to a motor vehicle door which has a (sheet-metal) panel construction and the opening to be covered by the door module is a cut-out of a door inner panel. This is given with the classic arrangement of the door inner panel and the door outer panel which is the case with most vehicles. Of course however it is also possible in a second embodiment for the motor vehicle door to have a frame structure, wherein the opening to be covered by the door module is at least regionally limited by the frame (e.g., composed of four hollow sections).

It is therefore evident that the present invention provides significant advantages compared to the state of the art which has been previously outlined. In particular one must note a saving of the water-proof fastening technology in contrast to the fastening of the door inner trim directly on the door inner panel. This leads to a considerable reduction of costs and weight. Added to this are advantages with regard to quality management, since there is no risk of the seal of the door inner panel being installed in a non-functioning manner during assembly, and thus a passage of moisture/dampness through the module plane.

One preferred further formation envisages the door module consisting of sheet metal or also of plastic. Here, plastics particularly lend themselves, since these are inexpensive to manufacture and apart from the weight-saving and water-proof properties are also favourable with regard to crash behaviour. Preferably polypropylene with inserted long fibres, e.g. PP 30 LGF, are considered for the plastic.

A further advantageous formation envisages the door module comprising a peripheral seal for restricting moisture with regard to the door opening. This e.g. may be a peripheral receiver, into which an elastomer hollow profile for example is incorporated in a rearwardly engaging manner. It may of course also be an elastomer web which is laid on. One may also apply a seal e.g. on the door inner panel for contact with the door module. For manufacturing reasons, it is recommended to incorporate this seal on the side of the door inner panel which faces the later vehicle interior. Here very many embodiments are possible, it is important however that the task of the door module of separating the wet from the dry is achieved.

One further advantageous embodiment envisages the bracket being integrally formed on the base body of the door module. With this, the inherent (intrinsic) deformation of the material of the door module should be designed such that the bracket always remains pressed onto the edge region (thus e.g. the door inner panel) even with vibrations/loading, in order to retain the reference dimension for a e.g. door inner trim fixed on the bracket. For this e.g. one may envisage a film hinge belonging to the base body being arranged in the transition region from the base body to the bracket. This film hinge on account of the material weakening in this region offers a higher elasticity and thus may provide the desired deformation properties. Integrally arranged brackets may be manufactured in a particularly simple manner in this way, e.g. they may be simply co-injected in a plastic injection moulding process. Furthermore it is also possible for the base body e.g. in this region perpendicular to the film hinge, to comprise a bridging web for stiffening the connection to the bracket.

A further advantageous embodiment envisages at least one bracket as a fixation point comprising an opening for clipping-in parts of the inner trim. By way of this e.g. it is possible to provide fastening systems which engage behind and clip in, in a particularly simple manner. Screwing, bonding or riveting is of course also possible in order to fix the door trim on the bracket.

One may vary the number of brackets depending on the stability of the door trim. In order to realise a uniform gap dimension around the outer contour of the door trim, it is particularly advantageous for 3 to 20, preferably 5 to 15 and particularly preferably 8 to 12 brackets to be distributed around the periphery of the trim or of the module.

As an alternative or also in combination with the integral integration of the bracket, it is envisaged for a bracket to be fastened on the base body of the door module by way of at least one movable spring element. Particularly movable couplings which may also be set at a later point in time are rendered possible by way of this. E.g. axial spring guides may be applied, so that it indeed becomes clear that the intrinsic deformation of the door module material is not necessary in order to permit the movement ability of the bracket with respect to the base module, even if with this variant it is probably the case of the most economical one.

A further development envisages the door module (or the base body of the door module) comprising fixation elements for fastening the door module on the edge region of the opening. These are preferably locking pins for example, which are snapped/locked into the door inner panel. With this, it is particularly useful if these are arranged within the described seal for the wet/dry separation, since here then there is no danger of the penetration of moisture/dampness when these e.g. locking pins are arranged on the side which is distant to the interior, and thus these may not create a passage of fluid through the door module.

One further advantageous embodiment envisages the elasticity of the bracket with respect to the base body being designed such that the base body is movable perpendicular to the door plane or the module plane by 1 to 10 mm, preferably 2 to 6 mm with respect to a reference point (preferably a support edge), whilst maintaining pressure of the support edge onto the edge region of the opening. By way of this, it is ensured that the support edge always remains pressed onto the edge region of the opening (e.g. the door inner panel), and thus the reference point for the connection of the door trim assembled on the bracket always exists independently of whether the door has uneven regions, or how the module is fastened with respect to the door inner panel.

As already shown above, the door module according to the invention, in particular for door modules of plastic which comprise receivers for a window lifting mechanism, loudspeakers or likewise has particular advantages in order, with this, to inexpensively provide a door inner trim and with a uniform gap dimension towards the door inner panel.

BRIEF DESCRIPTION OF DRAWINGS

FIG. 2a shows a construction according to a second embodiment according to the state of the art;

DETAILED DESCRIPTION

Figure 1:
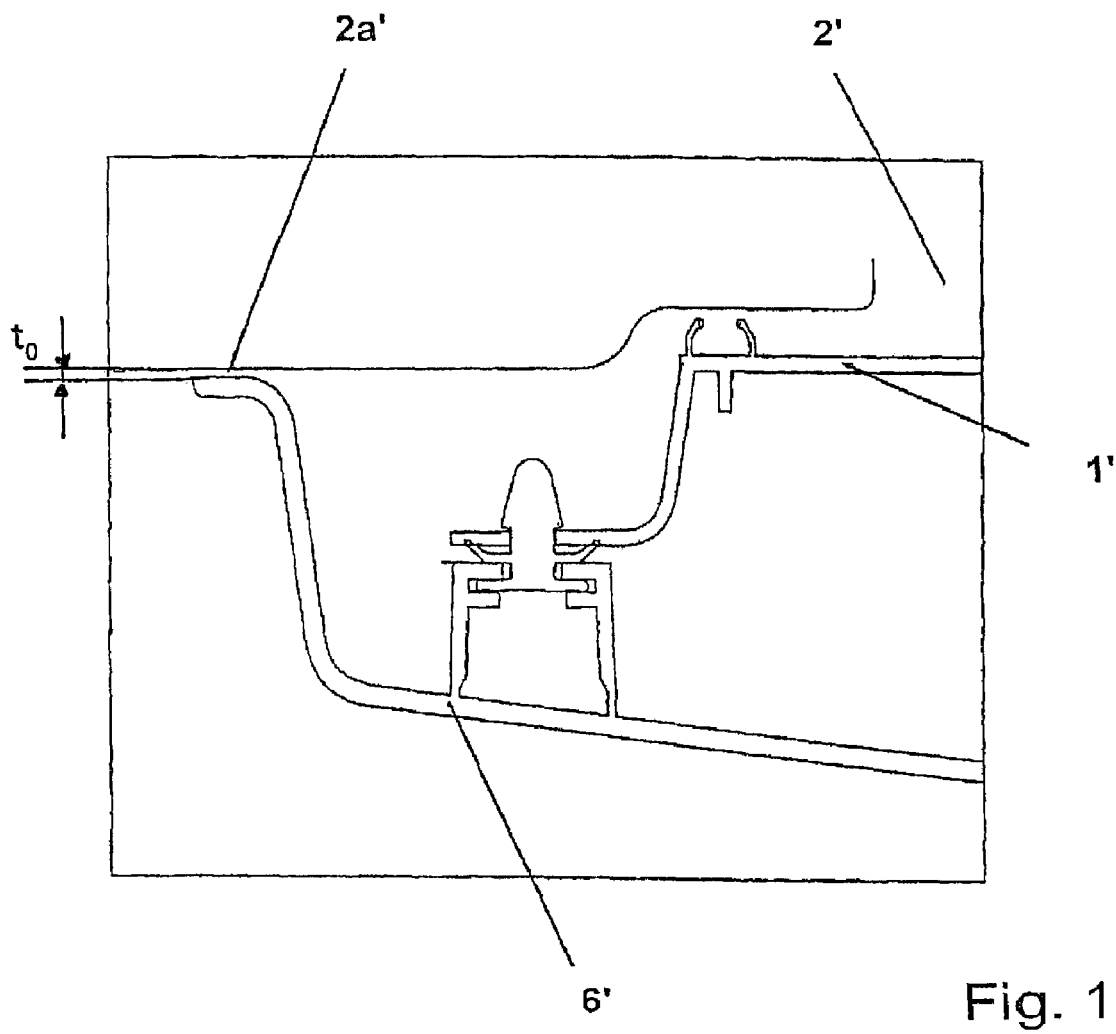
FIG. 1 shows a construction according to a first embodiment according to the state of the art.

FIG. 1 shows an arrangement according to the state of the art. In this, a motor vehicle door inner panel is shown with an opening 2' which is surrounded by an edge region 2a'. A plastic module 1' according to the state of the art (shown in FIG. 1 without a seal), is connected to the door inner panel in a direct manner, which is not shown here. A door inner trim 6' is fastened in the edge region of the door module 1' by way of a locking lug. With an exact matching of all fastenings, the gap dimension $t_0$ of the edge of the door inner trim with respect to the door inner panel is observed.

FIG. 2a shows a further variant according to the state of the art. Here a door inner trim is shown which comprises an opening 2", wherein the edge region around the opening is indicated at 2a". A door module 1" is assembled covering the opening 2". For observing the desired gap dimension $t_1$, the fastening of the door inner trim 6' follows directly in the edge region 2a" of the door inner panel, so that additional sealing measures are required here in order to achieve the wet/dry separation through the plane of the door module or of the door inner panel. FIG. 2a shows a further variant according to the state of the art. Here a door inner trim is shown which comprises an opening 2", wherein the edge region around the opening is indicated at 2a". A door module 1" is assembled covering the opening 2". For observing the desired gap dimension $t_1$, the fastening of the door inner trim 6' follows directly in the edge region 2a" of the door inner panel, so that additional sealing measures are required here in order to achieve the wet/dry separation through the plane of the door module or of the door inner panel.

Figure 2B:
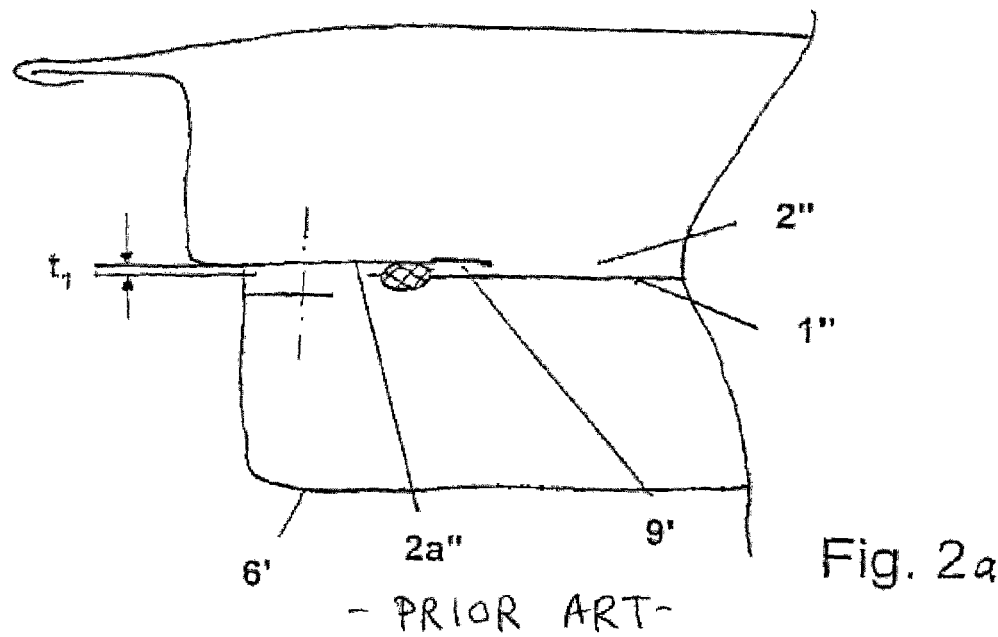
FIG. 2b shows a detailed cross section of a construction of an assembled door module according to an exemplary embodiment of the present invention.
Figure 2B:
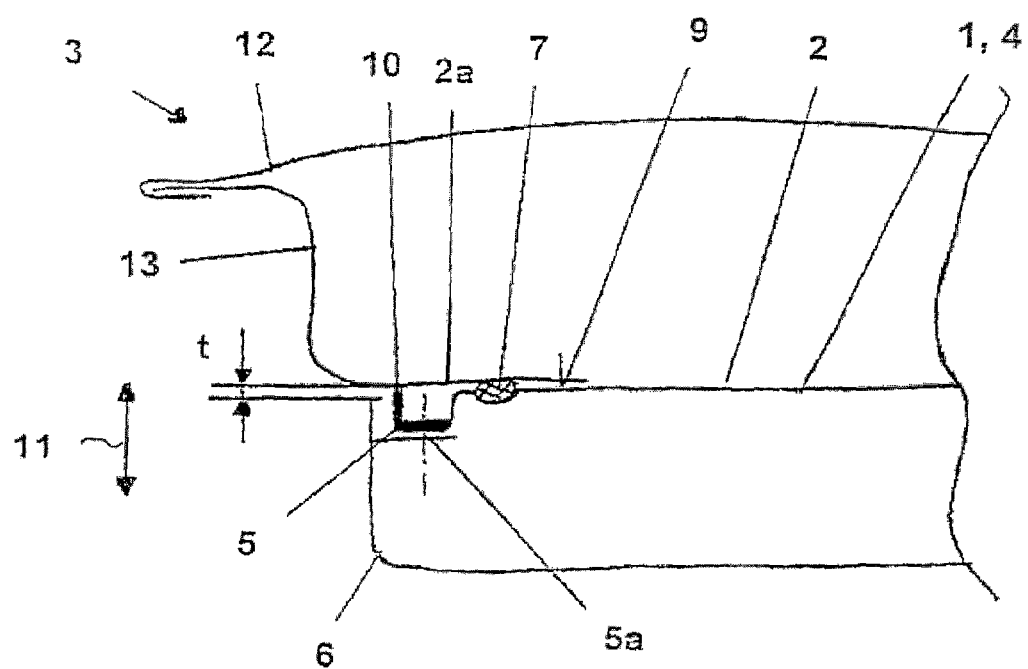

FIG. 2b shows an arrangement according to the invention. Here, a door module 1 according to the invention is shown which in its edge region comprises a peripheral seal 7 for limiting the moisture of the door opening 2. The schematic representation of the seal shown in FIG. 2b can once again be seen more clearly in FIG. 3a. Here an elastomer seal is incorporated into a U-shaped recess facing the door inner panel in a rearwardly engaging manner. The door module is of polypropylene with added longitudinal fibres, and the material is called PP 30 LGF. The fastening of the door module 1 onto the door inner panel 13 runs through fixation elements in the form of locking lugs 9, which on the side of the door module which is distant to the vehicle interior are integrally co-incorporated and which within the peripheral seal 7 is clipped into the door inner panel.

Brackets 5 (e.g., in total 10 brackets) are attached in the edge region of the door module. These brackets are an integral component of the door module. The door module thus comprises a base body which is connected to the brackets, wherein the bracket here is movable (here on account of the intrinsic elasticity of the transition region between the bracket and the base body). The bracket 5 has a support edge 10 which in the assembled position of the door module presses firmly onto the door inner panel. The bracket 5 on account of its material thickness and contour has a very stiff construction. The bracket 5 furthermore has a fixation point, here an opening 5a, into which a door inner trim e.g. is clipped in. By way of this arrangement, it is possible to maintain the strict tolerance measure t of the gap dimension between the door inner panel and the door inner trim.

Thus here a door module 1 for covering an opening 2 in a motor vehicle door 3 is shown (e.g., shown here by way of a door with a panel (e.g., sheet-metal) construction, wherein a door outer panel 12 is folded around a structured door inner panel 13 in the edge region), wherein the door module comprises a base body 4 which preferably in an edge region of the door module comprises at least one bracket 5 which is movable with respect to the base body, for support/resting on an edge region 2a of the opening, wherein the bracket has at least one fixation point 5a for fastening a door trim 6. This fixation point here is routed as an opening 5a, into which a locking lug of the door inner trim may be snapped in a rearwardly engaging manner. As already cited above, with regard to the bracket, it is the case of a very stable section of the module, since this on the one hand serves the fastening of the door inner trim, and on the other hand needs to be so stable that even under loading, the reference dimension towards the support edge 10 remains give, so that the tolerance dimension t of the door inner trim is always given. For this, it may be advantageous to design the transition region between the bracket and the base body 4 of the door module 1 as a film hinge, since here it is the case of an embodiment which is particularly simple to manufacture. This film hinge is already capable of being manufactured in an exact manner in the injection moulding process. This particularly lends itself for plastic modules. These plastic modules furthermore offer the advantage that infinite receivers 15 for a window-lifting mechanism, loudspeaker, fastenings for middle consoles, etc. are possible in a simple manner.

It is important that the bracket always has a clear reference point at the support edge 10, independent of the loading of the door or a possible release or deformation of the base body 1 with respect to the door inner panel. For this, here the elasticity of the bracket with respect to the base body (and specifically by way of a suitable configuration of the intermediate space between the bracket and the base body) is designed such that the base body is movable against the support edge 10 of the bracket perpendicular to the plane of the door (i.e. in the direction 11 in FIG. 2b) by 2 to 6 mm, whilst maintaining the pressure of the support edge on the edge region of the opening. By way of this, it is ensured that the support edge is always pressed onto the door inner panel, and thus the reference point for the door inner trim is always maintained independently of whether the door inner panel e.g. has uneven regions, or of whether the module slightly detaches from the door inner panel (e.g. after a long operation of the vehicle).

Finally two details of the embodiment according to the invention are dealt with.

Figure 3A:
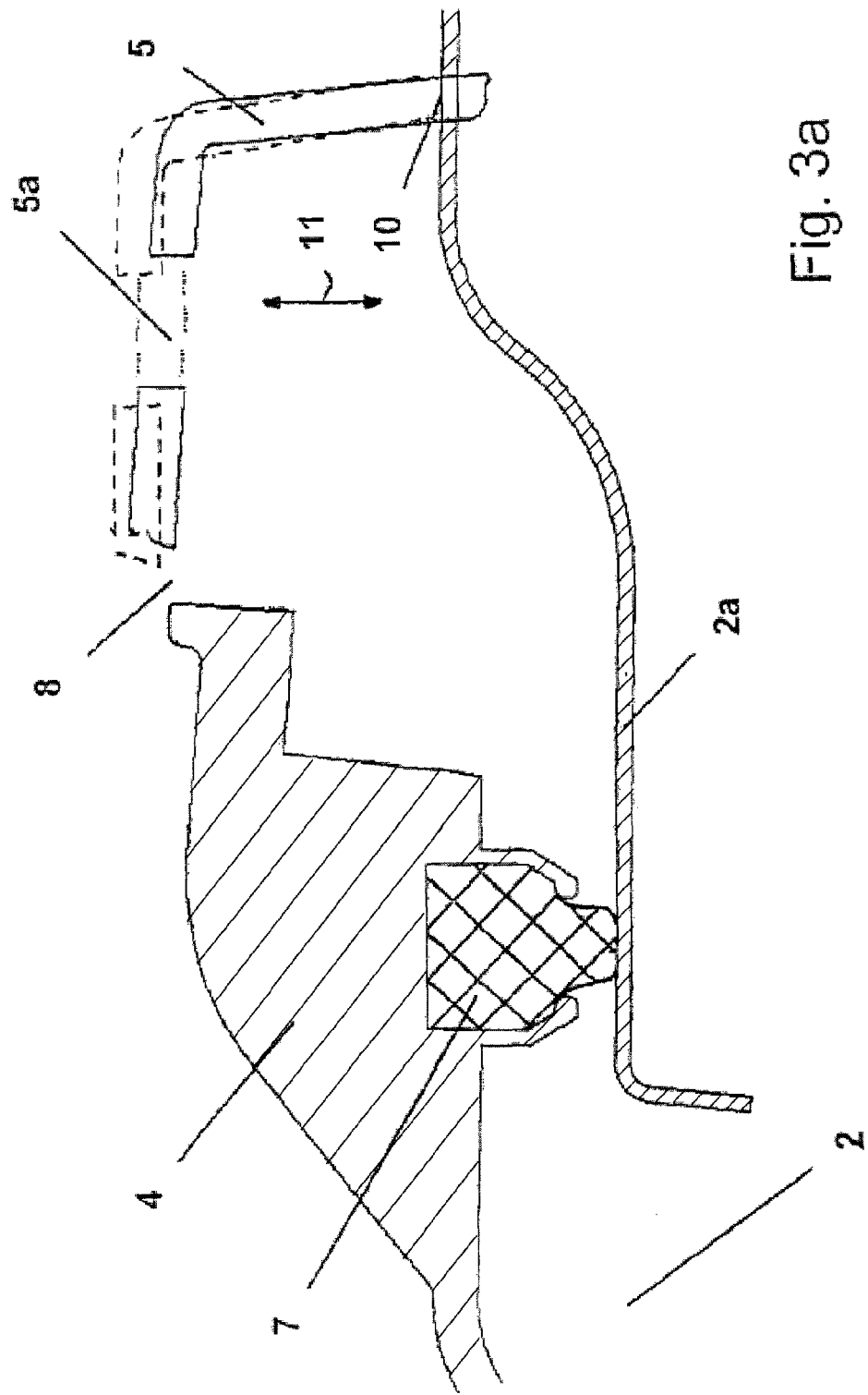
FIG. 3a shows a cross sectional view of an edge region of the door module according to an exemplary embodiment of the present invention.

FIG. 3a shows a cross section of the edge region of the door module which is directed onto the door inner panel. The base body 4 here is provided with a peripheral seal 7, wherein the seal is pressed an edge region 2a (e.g., formed by a door inner panel), wherein the edge region 2a surrounds the opening 2 in the door inner panel. Apart from the base body 4, here the bracket 5 is to be seen in two stages of movement. Here, the unbroken line shows the condition of the bracket in the undeformed condition of the transition region between the bracket and the base body. Since however the door inner panel exists, a deformation of the film hinge occurs, wherein the movement condition of the bracket 5 shown by the dashed line results. The door inner panel here acts as a counter bearing and the bracket 5 is supported with its support edge 10 on the door inner panel. This means that with an assembled door module, the bracket 5 is always fixed onto the door inner panel with pressure. By way of this, a clear reference point to the door inner panel always results for a door inner trim which is clipped into an opening 5a of the bracket. The bracing of the bracket according to the invention ensures that the desired reference dimension between the door inner trim and the door inner panel may always be set. Here the slight intrinsic deformation of the bracket (with respect to the film hinge 8) ensures that no intrinsic deformation of the bracket occurs which could unfavourably influence the tolerance dimension.

Figure 3B:
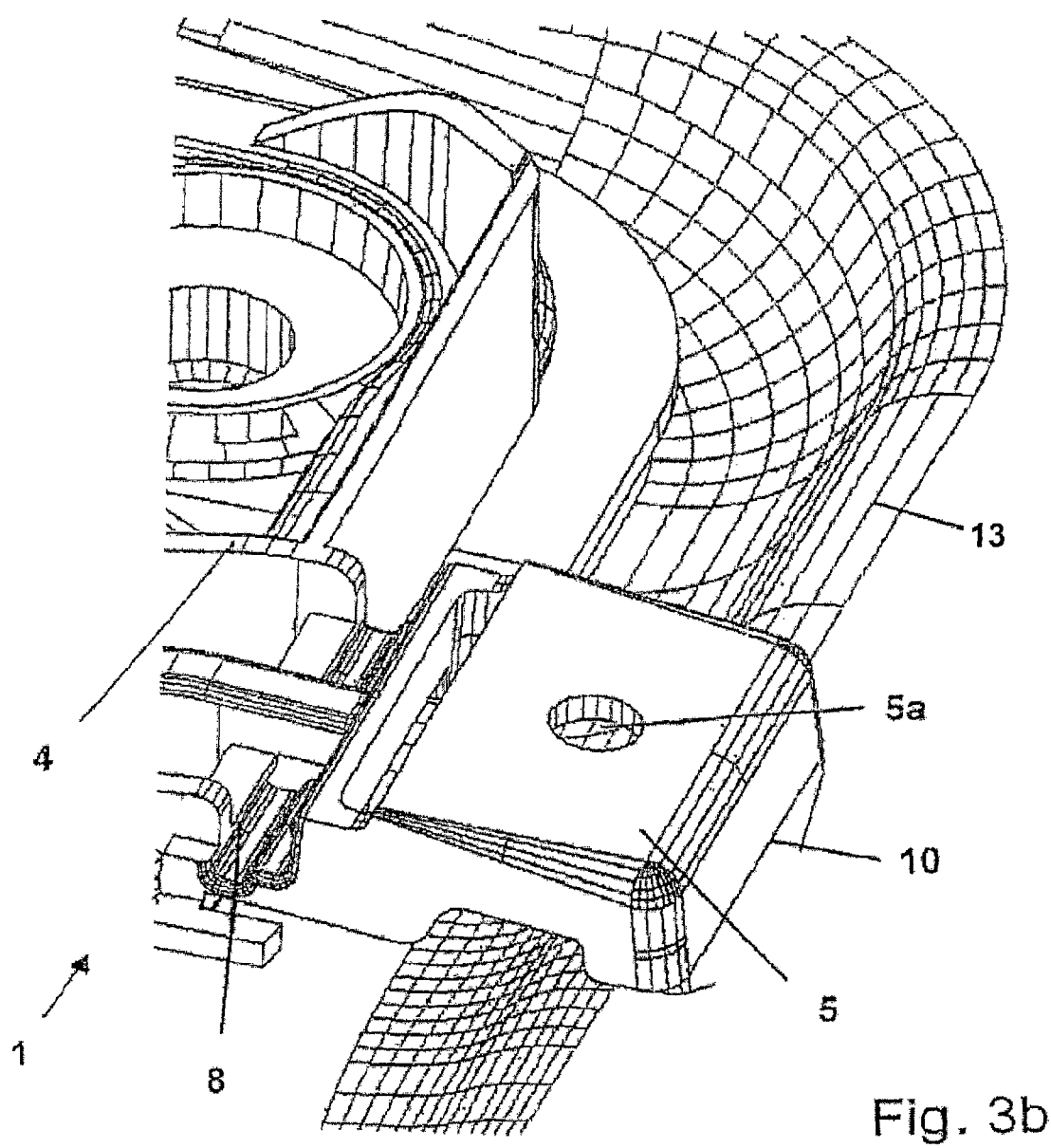
FIG. 3b shows a perspective view of the door module of FIG. 3a according to an exemplary embodiment of the present invention.

These conditions are once again clarified by way of the perspective view in FIG. 3b. Here too a door module 1 is shown which comprises a base body 4 in which e.g. elements of a window-lifting mechanism may be clipped. The base body 4 is connected to the bracket 5 via a film hinge 8 belonging to the base body 4. The film hinge 8 is incorporated into the plastic module in an integral manner. A bridge which perpendicularly crosses the film hinge is installed for stiffening the film hinge.

One may see particularly well in FIG. 3b how the bracket 5 with its support edge 10 is supported on the door inner panel 13. The opening 5a here offers a fixation point for snapping in a door inner trim.

Amongst other things, what is important with regard to the invention is to protect an integrated bracket connected to the module, by way of a film hinge or resilient element.

This integrated, resilient bracket of the module is supported on the inner panel and accommodates the door trim.

The result of this: the inner panel as known has certain tolerances in the planity. The resilient brackets of the module adapt individually and automatically to the actual condition of the inner panel. The door trim is then assembled on each of these brackets.

The result: the gap dimension between the door panel and the door trim is then only dependent on the height and the height tolerance of the brackets. Since this height is quite small, the tolerance will also be very small (interdependence between the nominal dimension and the tolerance).

The invention claimed is:

1. A module for covering an opening in a motor vehicle door and for supporting a door inner trim panel, comprising:
   a base and at least one bracket pivotable with respect to the base, the bracket including a) a first portion having at least one fixation opening which receives a first fastener for fastening the bracket only to the door inner trim panel and b) a second portion extending from the first portion substantially perpendicular to the first portion and contacting an edge region of the door surrounding the opening, and
   fasteners for fastening the module only to the edge region of the door,
   wherein the fasteners and the at least one bracket are laterally offset from each other.

2. The module according to claim 1, wherein the module comprises one of a metal and a plastic.

3. The module according to claim 1, wherein the base is movable with respect to a support edge of the bracket by 2 mm to 6 mm.

4. The module according to claim 1, further comprising: a peripheral seal.

5. The module according to claim 1, wherein the bracket is integrally formed on the base.

6. The module according to claim 5, wherein the bracket is coupled to the base by a film hinge.

7. The module according to claim 1, wherein the at least one bracket includes 3 to 20 brackets distributed around a periphery of the module.

8. The module according to claim 1, wherein the at least one bracket includes 5 to 15 brackets distributed around a periphery of the module.

9. The module according to claim 1, wherein the at least one bracket includes 8 to 12 brackets distributed around a periphery of the module.

10. The module according to claim 1, wherein the bracket is fastened to the base by at least one spring element.

11. The module according to claim 1, wherein the base is such that the base is movable with respect to a support edge of the bracket by 1 mm to 10 mm.

12. A motor vehicle door, comprising:
 a door inner trim panel and an inner panel with an opening;
 a module including a base and at least one bracket pivotable with respect to the base, the bracket including a) a first portion having a least one fixation opening which receives a first fastener for fastening the bracket only to the door inner trim panel and b) a second portion extending from the first portion substantially perpendicular to the first portion and contacting an edge region of the inner panel which surrounds the opening;
 a peripheral seal sealing the opening; and
 fasteners for fastening the module only to the edge region of the inner panel,
 wherein the door inner trim panel is fixed to the bracket via the fixation opening and the first fastener, and
 wherein the fasteners and the at least one bracket are separated by the peripheral seal and are laterally offset from each other.

13. A motor vehicle door according to claim 12, wherein the opening is a cut-out of the inner panel and is covered by the module.

* * * * *